No. 607,748. Patented July 19, 1898.
L. HUNT.
SUNSHINE RECORDER.
(Application filed Mar. 1, 1897. Renewed May 19, 1898.)
(No Model.)
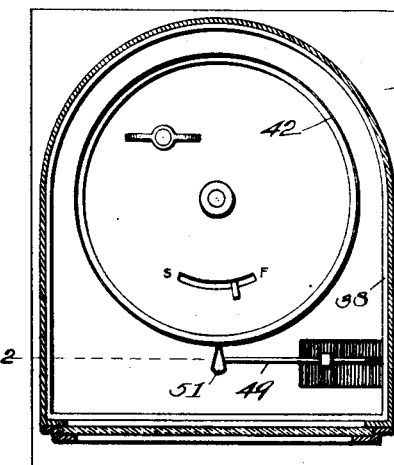
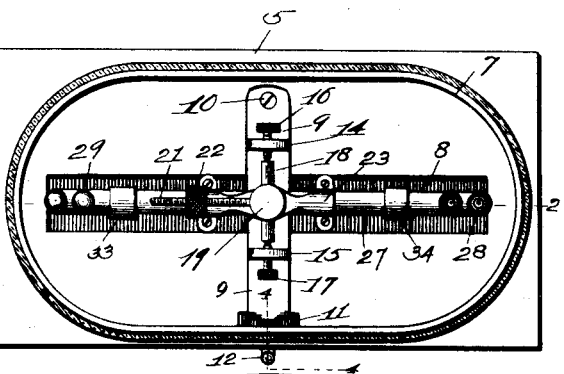
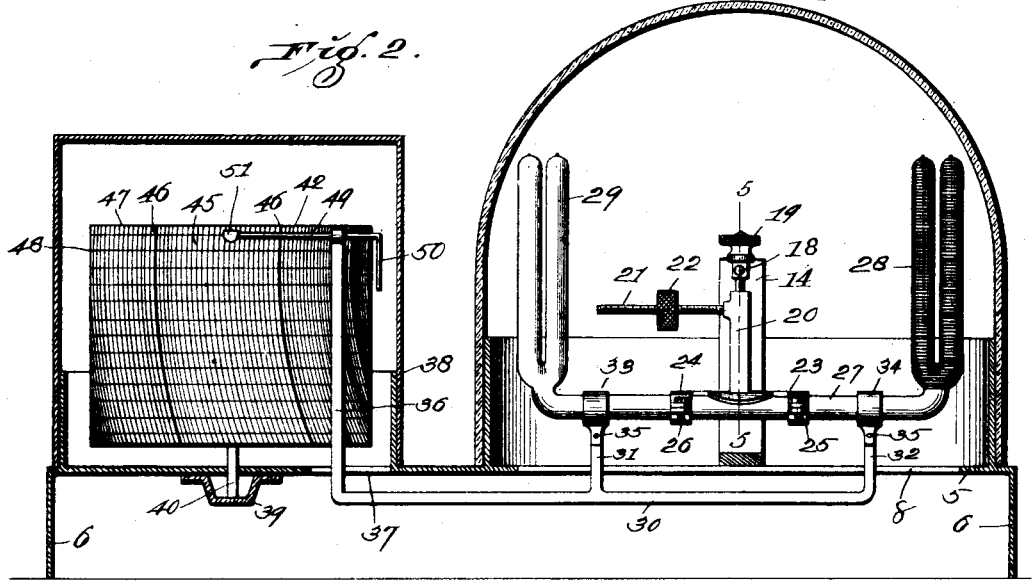
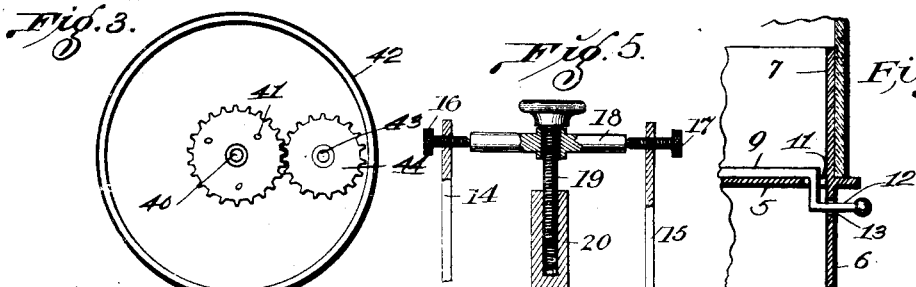
Inventor:
Leonard Hunt:—
By Higdon, Longan & Higdon
ATTYS.

UNITED STATES PATENT OFFICE.

LEONARD HUNT, OF ST. LOUIS, MISSOURI.

SUNSHINE-RECORDER.

SPECIFICATION forming part of Letters Patent No. 607,748, dated July 19, 1898.

Application filed March 1, 1897. Renewed May 19, 1898. Serial No. 681,169. (No model.)

*To all whom it may concern:*

Be it known that I, LEONARD HUNT, of the city of St. Louis, State of Missouri, have invented certain new and useful Improvements in Sunshine-Recorders, of which the following is a full, clear, and exact description, reference being had to the accompanying drawings, forming a part hereof.

My invention relates to sunshine-recorders; and it consists of the novel construction, combination, and arrangement of parts hereinafter shown, described, and claimed.

Figure 1 is a top plan view of my improved sunshine-recorder, the casings being shown in section. Fig. 2 is a vertical sectional view of the casing and frame, taken longitudinally of the machine and approximately on the line 2 2 of Fig. 1, the mechanism being shown in elevation. Fig. 3 is a bottom plan view of the casing containing the clockwork and showing the gearing for operating the casing. Fig. 4 is a vertical sectional view transversely of the machine and taken approximately on the line 4 4 of Fig. 1. Fig. 5 is a vertical sectional view on a line transversely of the machine and taken approximately on the line 5 5 of Fig. 2.

The frame of my sunshine-recorder may be constructed of sheet metal, and consists of the plate 5, mounted in a horizontal position and held from the supporting-table by means of the flange 6, which extends downwardly from the edges of said plate. The plate 5 is L-shaped when seen from the bottom, and the sheet-metal wall or flange 7 projects upwardly from said plate. The length of the inclosure formed by the wall 7 is approximately twice as great as the width of said inclosure, and said wall is upon the vertical part of the L formed by the plate 5. A rectangular opening 8 is formed through the plate 5 within the wall 7 and extending longitudinally of the machine, said opening being nearly as long as the inclosure formed by the wall 7.

The plate 9 is pivotally attached to the plate 5 by means of the screw 10 passing through one end of said plate 9 and into said plate 5. The plate 9 is positioned transversely of the opening 8 and approximately at its center, and the free end of said plate 9 extends downwardly through the opening 11, which opening is formed through the plate 5 immediately inside of the wall 7. A handle 12 passes horizontally through the opening 13 in the flange 6 and is attached to the free end of the plate 9. By manipulating the handle 12 the free end of the plate 9, which is above the plate 5, may be moved to change the angle of said plate 9 relative to the opening 8.

The posts 14 and 15 extend upwardly from the plate 9 from points on opposite sides of the opening 8, and horizontally-alined apertures are formed through the upper ends of said posts, said apertures being screw-threaded to receive the screws 16 and 17. The shaft 18 is mounted with the points of the screws 16 and 17 engaging the recesses in its ends. The screw 19 is loosely mounted in a bearing formed transversely through the center of the shaft 18, and the lower end of said screw 19 is screw-seated in the upper end of the block 20. A screw-threaded rod 21 projects horizontally from near the upper end of the block 20 and the weight 22 is screw-seated upon said rod. The arms 23 and 24 project horizontally in opposite directions from the lower end of the block 20 and in alinement with the opening 8 in the plate 5. Attached to the outer ends of the arms 23 and 24 are split bearings 25 and 26, and the glass tube 27 is adjustably mounted in said bearings. The tube 27 may be raised or lowered by manipulating the screw 19. The ends of the tube 27 are turned upwardly, and said tube is filled with mercury or other suitable material.

Attached to one of the upturned ends of the tube 27 and projecting upwardly are black tubes 28, the upper ends of which are sealed. Attached to and extending upwardly from the other one of the upturned ends of the tube 27 are white tubes 29, the upper ends of which are sealed.

The bar 30 is placed below the plate 5 and the arms 31 and 32 extend upwardly from said bar 30 through the opening 8, and the straps 33 and 34 extend from the upper ends of said arms 31 and 32, respectively, around the tube 27, and the free ends of the straps are secured to the upper ends of said arms by means of the screws 35, thus forming a removable connection between the bar 30 and the tube 27. An arm 36 extends upwardly from the bar 30 through the opening 37 in the plate 5, which opening is within the inclosure formed by the wall 38. The arm 32 is attached to one end of the bar 30, the arm 31 is attached to the bar 30 at a point approximately at its center, and the arm 36 is attached to the free end of the bar 30, or the end opposite the end to which the arm 32 is attached. The wall 38 extends upwardly from the horizontal portion of the L formed by the plate 5. In plan the wall 38 is semicircular upon its rear side and substantially straight upon its other three sides.

The bracket 39 is attached to the lower face of the plate 5, and the shaft 40 is inserted through the plate 5, with its lower end secured to the bracket 39, and said shaft projects upwardly in a vertical position from the plate 5 at a point approximately at the axial center of the semicircular portion of the inclosure formed by the wall 38. The shaft 40 is rigidly and non-rotatably mounted, and the spur-gear 41 is mounted upon and fixed to said shaft 40 a short distance above the plate 5.

A cylindrical casing 42 is rotatably mounted upon the shaft 40 above the plate 5, and said casing contains the clockwork of the usual construction, which clockwork drives the shaft 43, and said shaft 43 is mounted in a position parallel with the shaft 40. The spur-gear 44 is fixed upon the lower end of the shaft 43 and meshes with the gear 41. The operation of the clockwork drives the gear 44, and said gear meshing with the gear 41 will travel around the gear 41, thus rotating the casing 42. The gear 41 is fixed stationary and does not rotate, while the gear 44 rotates with the shaft 43 and meshes with the gear 41, thus producing a planetary motion. The speed of the clockwork is so regulated that the casing 42 will make a revolution once in seven days.

The strip of paper 45 is secured in position around the casing 42, and said strip of paper is divided by the heavy lines 46 into seven equal parts, one part for each day of the week. Each of the parts between the lines 46 is divided into twenty-four parts by the light lines 47 running parallel with the heavy lines 46. The lines 46 and 47 run transversely of the strip of paper, or substantially vertical. The paper is divided into ten or twelve equal parts by the lines 48 extending horizontally around the casing, or substantially at right angles to the lines 46 and 47.

A rock-shaft 49 is mounted in a bearing in the upper end of the arm 36, and a crank-arm 50 extends downwardly from one end of said rock-shaft. A V-shaped receptacle 51 is attached to the opposite end of said rock-shaft from the crank-arm 50 and in position to have its point engage the strip of paper 45. The receptacle 51 is filled with suitable ink, and said receptacle is adjusted into and out of engagement with the paper 45 by operating the handle 12. The device is normally adjusted by manipulating the weight 22, the screw 19, and by positioning the tube 27 in the bearings 25 and 26, so that the bar 30 will assume a horizontal position and the pen 51 will be in engagement with the paper 45 upon the upper one of the lines 48.

When the sun shines, the black tubes 28 will absorb more heat than the white tubes 29, and the expansion of the air within said black tubes will force the mercury in the tube 27 toward the white tubes 29, and the preponderance of mercury in that end of the tube 27 will overbalance the tubes 28 and depress the pen 51. The casing 42 will be rotated by the clockwork, thus making a frictional contact between the paper 45 and the pen, and a line will be drawn upon said paper by said pen, and thus will be recorded the intensity of the sunshine. The upper one of the lines 48 will be marked "0," the next line below "1," and the next line "2," and so on, thus indicating the degrees of sunshine. The more intense the sunshine the lower will be the contact-point between the pen 51 and the paper 45, and the line drawn by said pen upon said paper will be irregular and will accurately record the varying intensity of the sunshine.

It is obvious that the construction may be reversed—that is, the black tubes 28 and the white tubes 29 may be transferred—and then the zero-mark will be upon the lower one of the lines 48 instead of upon the upper one.

I claim—

1. In a sunshine-recorder, a pipe pivotally mounted with the substantially horizontal central portion filled with suitable liquid and having its ends turned upwardly into planes above said horizontal portion and filled with air and hermetically sealed, and said ends being constructed for the differential absorption and radiation of heat, an arm secured to said pipe and extending horizontally from said pipe, a recording instrument carried by the free end of said arm, a cylindrical casing mounted in a vertical position and having a recording-surface in position to be engaged by said recording instrument, and means of rotating said casing, substantially as specified.

2. In a sunshine-recorder, a pipe pivotally mounted; said pipe having a substantially horizontal central portion filled with a suitable liquid and having its ends turned upwardly into planes above said horizontal central portion, said ends being hermetically sealed and forming air-chambers communicating with said liquid and said ends being constructed to present large surfaces for the differential absorption and radiation of heat; an arm attached to and projecting horizontally from said pipe and in alinement therewith, a recording instrument carried by the free end of said arm, a vertical cylindrical casing rotatably mounted and having a recording-surface in position to be engaged by said recording instrument, and means of adjusting said recording instrument to and from said recording-surface, substantially as specified.

3. In a sunshine-recorder, a plate mounted in a horizontal position and having an opening through its center, a second plate mounted above the first-mentioned plate and transversely of said opening and having one of its ends pivotally connected to said first-mentioned plate, posts projecting upwardly from said second plate, a pipe pivotally mounted between the upper ends of said posts; said pipe having a substantially horizontal central portion filled with a suitable liquid and having its ends turned upwardly into planes above said horizontal central portion, said ends being hermetically sealed and forming air-chambers communicating with said liquid and said ends being constructed to present large surfaces for the differential absorption and radiation of heat; an arm secured to said pipe and extending horizontally from said pipe, a recording instrument carried by the free end of said arm, a cylindrical casing mounted in a vertical position and having a recording-surface in position to be engaged by said recording instrument, and means of rotating said casing, substantially as specified.

4. In a sunshine-recorder, a plate mounted in a horizontal position and having an opening through its center, a second plate mounted above the first-mentioned plate and transversely of said opening and having one of its ends pivotally connected to said first-mentioned plate, posts projecting upwardly from said second plate, a pipe pivotally mounted between the upper ends of said posts, means of adjusting and balancing said pipe; said pipe having a substantially horizontal central portion filled with a suitable liquid and having its ends turned upwardly into planes above said horizontal central portion, said ends being hermetically sealed and forming air-chambers communicating with said liquid and said ends being constructed to present large surfaces for the differential absorption and radiation of heat; an arm secured to said pipe and extending horizontally from said pipe, a recording instrument carried by the free end of said arm, a cylindrical casing mounted in a vertical position and having a recording-surface in position to be engaged by said recording instrument, and means of rotating said casing, substantially as specified.

In testimony whereof I affix my signature in presence of two witnesses.

LEONARD HUNT.

Witnesses:
EDWARD E. LONGAN,
MAUD GRIFFIN.